March 15, 1927.
M. E. BENESH
MEANS AND METHOD FOR ASCERTAINING, INCREASING, AND MAINTAINING THE EFFICIENCY OF WATER GAS GENERATING MACHINES
Filed July 8, 1921
1,620,864
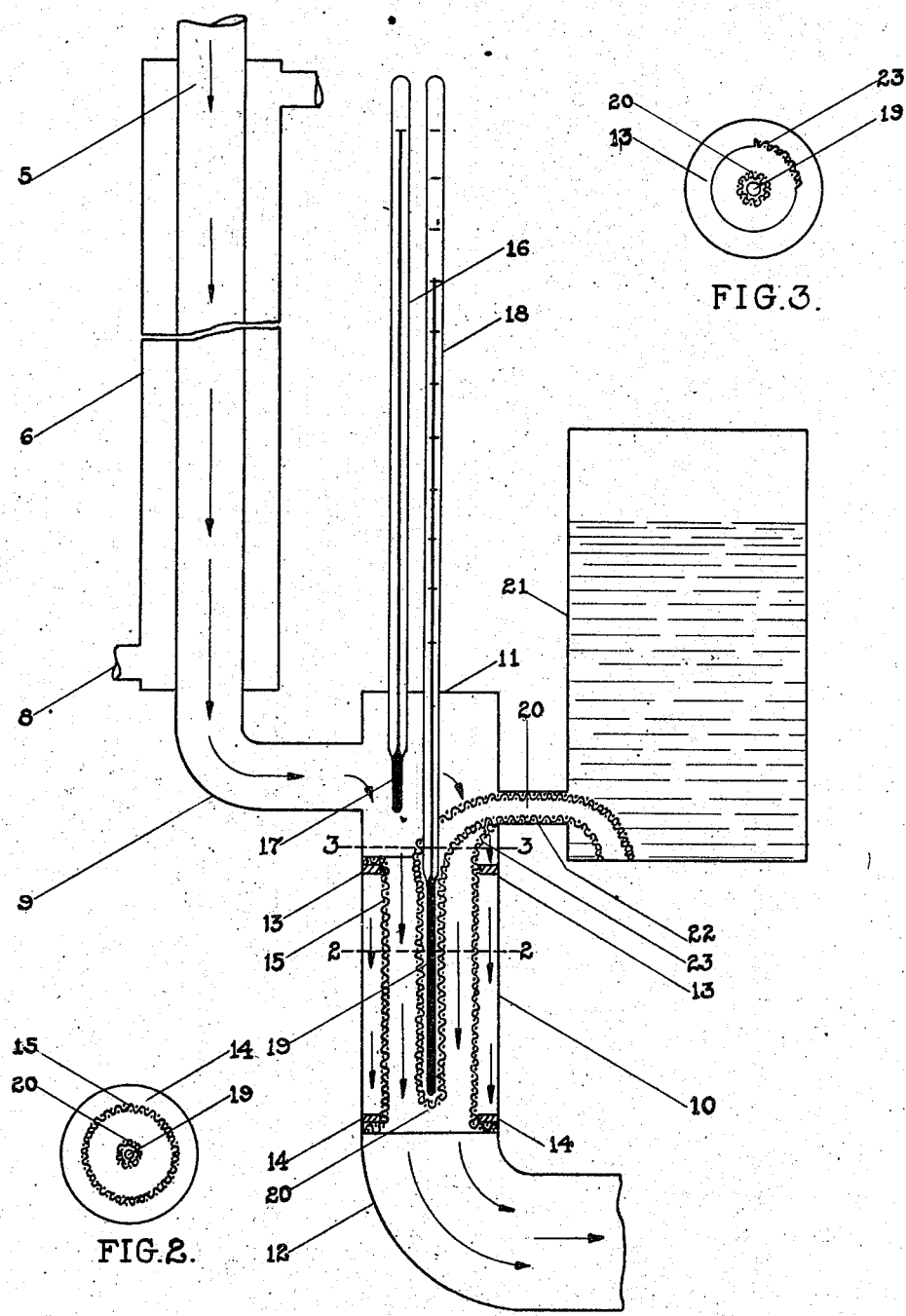

Patented Mar. 15, 1927.

1,620,864

UNITED STATES PATENT OFFICE.

MATTHEW E. BENESH, OF CHICAGO, ILLINOIS.

MEANS AND METHOD FOR ASCERTAINING, INCREASING, AND MAINTAINING THE EFFICIENCY OF WATER-GAS-GENERATING MACHINES.

Application filed July 8, 1921. Serial No. 483,122.

This invention relates to improvements in the means and methods for ascertaining (at intervals or continuously), increasing, and maintaining the efficiency of water gas generating machines, either manually or automatically.

It is well known that the temperature of the fuel bed in a water gas generator is neither uniform nor constant in distribution through the fuel depth; that, from a practical standpoint, it is very difficult, if not impossible, to measure; and likewise that to measure the temperature of the gas coming off is futile for determining the percentage of the blue gas therein.

The percentage of blue gas produced also depends upon the time of contact of the steam with the fuel, the depth and temperature of the fuel bed, and the percentage of voids and distribution of fuel, which several factors are naturally ever-changing and even for a given set of the conditions, the percentage of steam decomposition is not a simple straight-line function of the time of contact, so that it can be said, for example, that doubling the time of contact would double the percentage of decomposition.

Intimacy of contact is another element to be considered, for at best the chemical action in a fuel bed is far from uniform, as the fuel varies in size, and the free spaces between the coke are of irregular distribution, and also in view of the further fact that the fuel bed generally is most open around the lining of the generator and thereby the quantity of gas and the quality of the gas obtained from various portions of the fuel bed vary, the percentage of decomposition in the central portion usually being higher than at the edges.

Prior to my invention, in efforts to ascertain the volume of gas produced by an individual gas apparatus, many devices had been tried, which devices depended generally upon the measurement of a dynamic head developed by the flowing mixture of gas and vapor, either before or after the washbox, which measurement being dependent upon the density of the mixture, is unreliable and impracticable because of the rapidly varying high temperature, further complicated by varying tar and water vapor content, to such a degree that, prior to my invention, so far as I am aware, no practical means or method had been developed for accurately measuring the volume of gas made by an individual gas apparatus.

The object of my invention broadly stated, is to provide a novel means and method by which it is possible and practicable to either manually or automatically accurately ascertain and determine the efficiency of a water gas generator continuously throughout its operation and accordingly enable the operator to so regulate the rates and times of steam and air inputs that maximum efficiency or capacity may be realized.

A further object of my invention is to make possible in a carbureted water gas set the introduction of oil in correct quantities for carbureting the blue gas made during each run and thereby assure maintenance of heating value or candle power and the use of oil to the best advantage, which usually occurs when the most british thermal units or candles per gallon, are put into the gas from the oil, that is when maximum oil cracking efficiency is realized.

With these ends in view, my invention finds embodiment in certain features of novelty in the construction, combination and arrangement of parts and methods of deduction, calculation and interpretation, by which the said objects are attained, all as hereinafter fully described with reference to the accompanying drawings and more particularly pointed out in the claims.

In said drawings,—

Fig. 1 diagrammatically illustrates in elevation and partly in section an apparatus in which my invention finds its embodiment.

Fig. 2 is a transverse section taken on the line 2—2 of Fig. 1; and

Fig. 3 is a transverse section taken on the line 3—3 of Fig. 1.

Similar characters of reference indicate the same parts in the several figures of the drawings.

I may employ any of the standard types of water gas generators, such, for example, as those known as the "Lowe three shell machine", or the "Williamson single shell machine", or the twin machines or any gas producer, such as the Morgan, Kerpley, etc.

In the apparatus shown in the drawing, 5 indicates a pipe which leads from the connection between a carburetor and generator (not shown), which pipe is surrounded, for a substantial portion of its length, by a steam jacket 6, to which steam from any suitable source is supplied adjacent its upper end through an inlet 7 and discharged from the jacket adjacent the bottom end thereof through an outlet 8 by suitable connections.

The pipe 5 is provided at its lower end with an elbow 9, opening into a chamber 10 closed at its upper end, as indicated at 11, and opening at its lower end into an elbow 12 through which the gases, after passing through the chamber 10, are discharged into the open air or else returned to the gas set through a suitable pipe connection (not shown).

The chamber 10 is provided at a point below the elbow 9 with an annular ring or plate 13, and also with another annular plate or ring 14 next above the elbow 12, which rings are connected by a cloth or wicking tube 15 extending across the inner edges of the rings and secured thereto by any suitable means. Through this tube 15 the gases from the elbow are free to pass into the elbow 12, the rings 13 and 14 being also preferably perforated so that the gases may also pass downwardly between the tubing into the elbow.

Projecting through the cover 11 for the chamber 10 is a dry bulb thermometer 16, the bulb 17 of which projects in the path of the gases discharging from the elbow 9 and terminates somewhat above the ring 9.

Also projecting through the cover 11 is a thermometer 18, the bulb 19 of which is located and projects below the ring 13 and terminates just above the plane of the ring 14, which bulb 19 is enclosed for its entire length in a tubular wicking 20, which extends slightly above the bulb and the ring 13 and outwardly through the chamber 10 into a water reservoir 21, and for which purpose there preferably is a tubular connection 22 between the chamber 10 and the reservoir 21, providing a passage for the tubular wicking 20.

In operation the pipe 5 is connected with the generator outlet or at a suitable point between the carburetor and generator, from which a portion of the mixture of fixed gas (blue gas) and water vapor is conducted through the pipe 5, the elbow 9 and the chamber 10, to and out of the elbow 12, the constancy of the temperature of which mixture is maintained in the pipe 5 by means of the circulation of steam through the steam jacket 6, at a point above the dew point of the vapor until it reaches and passes the dry bulb 17 of the thermometer 16, the temperature so indicated merely serving to show that the first condition of my method is being realized, viz: that the mixture is at the calibration temperature, which latter is above the dew point.

The mixture next flows around the bulb 19 of the thermometer 18, which operates as a wet bulb thermometer owing to the fact that it is covered by the cloth or wick tubing 20 constantly moistened by water supplied thereto from the tank 21 by capillary attraction and gravity. Adiabatic conditions are assured since the bulb 19 is surrounded by the fibrous or wick tube 15, a portion of which, 23, projects upwardly and is secured to the wick tube 20, connected with and suspended as it is between the annular rings 13 and 14.

The rate of flow of the mixture through the apparatus must be that which is used during calibration and may be indicated by any standard flow device, such as an orifice, Pitot tube, float, or the like.

With this construction, the variation of the temperature of the wet-bulb thermometer will indicate the variation of the vapor content of the mixture. The temperature indicated by the wet bulb thermometer depends on the character of the liquid and of the gas, the velocity and pressure of the mixture of gas and vapor, the temperature of the dry bulb and the construction of the instrument, so that a calibration with known mixtures is most practical.

From this vapor content indication, which may conveniently be in per cent, the volume of gas made can be deduced, as follows:

By well-defined laws of physics and chemistry for blue gas of definite composition, the volume of steam required to produce a certain volume of blue gas can readily be computed.

Thus, for example: since one volume of steam will give one volume of hydrogen and one volume of carbon monoxide, we know that for ideal blue gas, consisting of hydrogen and carbon monoxide, one volume of steam decomposed gives two volumes of blue gas. For such blue gas, an indication of zero per cent vapor on the wet bulb thermometer will indicate that all of the steam introduced into the generator was being decomposed and that the volume of blue gas is twice the volume of steam introduced, the volume of steam introduced into the generator being obtained from a steam meter. Similarly, an indication on the wet bulb thermometer of 50% vapor means that 33% of the steam is being decomposed, viz:

$$\left[\frac{100-50}{2}\right] \div \left[\frac{100-50}{2}+50\right] = .33 \text{ (or } 33\%)$$

For a blue gas of different composition, similar calculation is practical and any convenient scale can readily be made up, e. g., such as one reading cubic feet of blue gas per pound of steam.

In this connection it is to be understood that my invention includes the connection of the pipe 5 directly with a generator for ascertaining alone the vapor content of blue gas, or the connection of this pipe with a carburetor to the exclusion of the generator for ascertaining the vapor content of the carbureted gas, as well as the simultaneous connection of the pipe 5 with both a generator and carburetor, as hereinbefore described.

The former methods measure the velocity of a column of gas and vapor, while the herein-described method determines the quality of the blue gas and vapor mixture with regard to the undecomposed steam content, and from the measured steam input enables the operator to know how much steam is being decomposed and thus how much blue gas is being made and the rate of making the same.

The method of my invention is unique in combining quality determination (ratio of vapor to gas volume) with a quantity determination (rate of steam flow) to get the desired quantity—rate of blue gas production. Integration, manual or automatic, thus gives total production over limits of integration.

The method of making the quality determination in accordance with my invention is a humidity determination under specially induced conditions which make it possible and practicable to provide a direct reading scale on one thermometer so that it becomes unnecessary to use complex tables involving wet and dry bulb temperatures.

Of course, the maintenance of the dry bulb at a constant temperature is not indispensable to the operation, it being merely necessary that the dry bulb be above the dew point of the mixture.

While my invention has been described in connection with water gas apparatus for measuring the volume of blue gas developed therein, it is now to be observed that it extends to and includes a means and method for continuously measuring condensable vapors and gases in mixtures of (1) different vapors; (2) different gases; (3) different vapors and gases, as, for example, for measuring and determining the excess of steam in producer gas, and also the benzol content of a mixture of air and benzol vapor can be determined by moistening a wet bulb with benzol instead of water, or the like.

My invention also contemplates and includes the use of any form of temperature indicating, recording or integrating device other than the mercurial thermometer shown in the drawings; such, for example, as thermocouple, resistance thermometer, differential expansion of metal, gas, liquid, or the like.

Having described my invention, what I claim and desire to secure by Letters Patent is:

1. The method of determining the percentage by volume of undecomposed steam in gases from a water gas generator, which includes bringing said gases to a predetermined constant temperature above the dewpoint and reading a wet bulb thermometer inserted in the flow of said gases and calibrated at said temperature to read the moisture content directly in percentage by volume.

2. The method of determining the volume of undecomposed steam in gases from a water gas generator, which includes metering the steam introduced into said generator, bringing the gases from said generator to a predetermined constant temperature above the dewpoint and reading a wet bulb thermometer inserted in the flow of said gases and calibrated at said temperature to read the moisture content directly in percentage by volume.

3. The method of determining the percentage by volume of undecomposed steam in gases from a water gas generator, which includes bringing said gases to a predetermined constant temperature above the dewpoint and reading a device inserted in the flow of said gases and calibrated at said temperature to read the moisture content directly in percentage by volume.

4. In a device for determining the percentage by volume of undecomposed steam in gases from a water gas generator, means for bringing said gases to a constant temperature above the dewpoint of said gases, means for measuring said temperature and means comprising a wet bulb thermometer calibrated to read directly at said temperature the percentage by volume of moisture.

In witness whereof, I have hereunto set my hand this 6th day of July, 1921.

MATTHEW E. BENESH.